Jan. 7, 1969
R. S. KUNZ
3,420,570
LOCKABLE AND REMOVABLE TRUCK BED COVER ASSEMBLY
Filed May 24, 1966
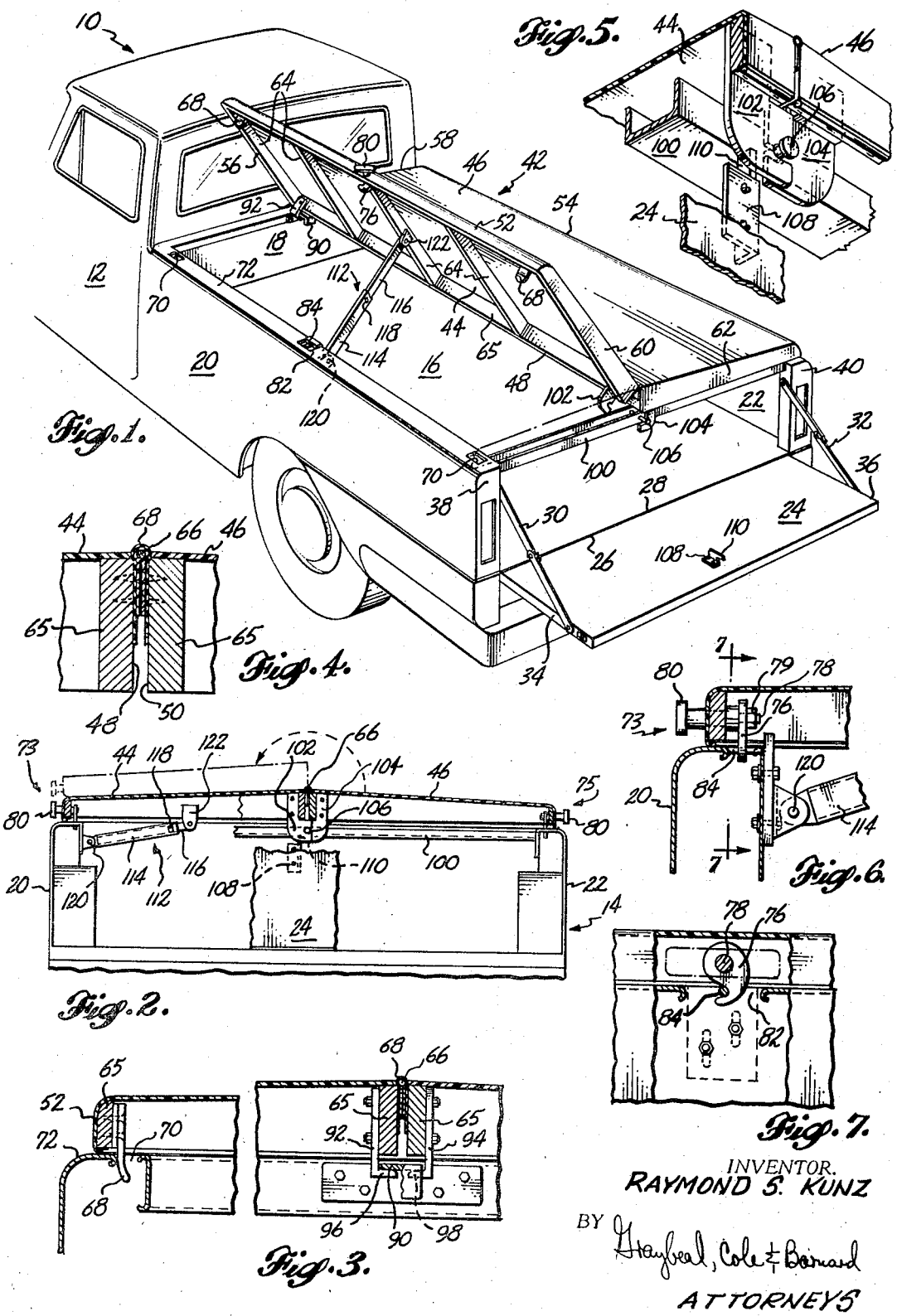
INVENTOR.
RAYMOND S. KUNZ
BY Graybeal, Cole & Barnard
ATTORNEYS

United States Patent Office

3,420,570
Patented Jan. 7, 1969

3,420,570
LOCKABLE AND REMOVABLE TRUCK BED COVER ASSEMBLY
Raymond S. Kunz, 17915 50th Ave. South, Seattle, Wash. 98118
Filed May 24, 1966, Ser. No. 552,529
U.S. Cl. 296—100      5 Claims
Int. Cl. B60p *7/02;* B65d *51/18;* B65d *43/24*

ABSTRACT OF THE DISCLOSURE

A vehicle body and cover member comprising two longitudinally extending cover panels, each having front, rear, inside and outside edges, said cover panels being pivotally connected to one another along the inside edges, tabs and hook-type fasteners mounted on the outside edges of the cover panels for securing the panels to the side walls of a pickup truck, hook-type fasteners mounted on said cover panels adjacent said front edges thereon for securing the cover panels to the front wall of the pickup truck, a cross bar having opposite ends secured to upper rear corners of the truck bed side walls and extending transversely therebetween, hook-type fasteners mounted on said cover panels adjacent said rear edges thereof for securing the rear edges to said cross bar, collapsible links pivotally mounting the tail gate of said truck to the floor surface of the truck bed, a latch on the inside surface of the tail gate and when the tail gate is closed the latch to be inside of the hook-type fastener on the rear edge of the cover panel, and a collapsible telescopic support brace disposed between at least one of said truck bed side walls and an associated cover panel.

---

The present invention relates generally to load carrying vehicles, such as pickup trucks and the like, having an open load carrying bed. More specifically, the invention is directed to an improved cover assembly for the load carrying compartments of such vehicles.

Load carrying vehicles, such as pickup trucks, trailers and the like commonly include a load carrying bed defined by a horizontal floor surface with stationary front and side walls and a pivotally movable rear wall commonly known as a tail gate, which is movable to and from an upstanding position to a horizontal position substantially aligned with the floor surface to facilitate loading and unloading operations.

Such vehicles have proven to be extremely useful and popular in recent years. One disadvantage associated with them, however, is that the open bed leaves the load carried therein subject to damage by dust, rain, sleet, snow, flying debris and various other undesirable elements. Moreover, articles are liable to bounce out of the bed while the vehicle is in motion. The open bed also permits its contents to be viewed by and be accessible by passers-by, thereby detracting from the appearance of the vehicle and inviting pilferage.

Although it is necessary to keep the bed of such vehicles open when relatively tall objects are to be carried therein, it is also desirable to have a readily detachable cover member for covering the bed and protecting and securing its contents when the size of the contents permits.

While various types of cover members have been designed for vehicle beds of the type discussed above, none has proved to be entirely satisfactory. Generally, these cover members have been of three types.

The first type comprises two separate cover panels, each of which is hinged to the upper edge of one of the side walls of the bed. When this type of arrangement is employed, the bed must be loaded and unloaded from the rear. This becomes a particularly burdensome task when handling items toward the front of the bed, and it is often necessary to climb into the bed during the loading and unloading operations. Another disadvantage associated with this type of cover arrangement is that it is somewhat tedious and time consuming to install and remove, since the hinges connecting the cover panels to the side walls must be attached and detached. This type of cover assembly also makes no provision for locking the enclosed bed area, including the tail gate of the bed.

A second type of cover construction which has been devised comprises a single cover member hinged to the bed of the vehicle adjacent the front end thereof. While this arrangement permits loading from the rear or sides of the bed, it is quite awkward to handle, especially when it is necessary to remove the cover to permit tall objects to be carried in the bed. Two or more persons are ordinarily required to detach and stow the cover, and a large storage area must be provided for the relatively large and bulky member.

The third type of cover construction comprises two separate cover panels, each of which is arranged to pivot about an axis adjacent the longitudinal center of the vehicle bed, thereby permitting loading and unloading from the sides of the bed. Such constructions have several disadvantages associated with them, however. In the first place, the vehicle bed must be equipped with awkward frame pieces, such as cross bars, side rails and/or end panels in order to have the cover panels hinged at the approximate center of the bed. These frame pieces not only obstruct loading and unloading operations, but also complicate the tasks of removing the cover when tall objects are to be carried in the bed, and replacing the cover when the size of the load to be carried permits. Moreover, the relatively large and bulky nature of these constructions require large storage areas. Such cover constructions are also relatively time consuming and expensive to manufacture and assemble.

Accordingly, it is the general object of the present invention to provide a cover construction for the load carrying compartments of vehicle bodies, such as pickup trucks and trailers, which overcomes the deficiencies and disadvantages associated with the prior art types of covers discussed above.

More specific objects of this invention are to provide a cover construction for load carrying vehicle compartments which: (1) permits the enclosed bed area to be completely locked up, (2) permits the compartment to be loaded and unloaded conveniently from the rear or sides thereof; (3) is rigid, yet lightweight and compact to permit a single individual to attach it to and detach it from the compartment and stow it in a relatively small storage area; and (4) is relatively simple and inexpensive to manufacture and assemble.

A further and more specific object of this invention is to provide a cover assembly for the bed of a pickup truck or the like which is adapted to be locked on the bed at each of its peripheral edges, and which is adapted to cooperate with locking means on the tail gate of the truck for selectively locking the gate closed.

Briefly, the foregoing objects have been realized by providing a cover member comprising two separate longitudinally extending cover panels hingedly connected to one another along their inside edges. The front and outside edges of each cover panel and the front and side walls of the truck bed are provided with cooperating fastening means for locking the front and side edges of the cover member on the bed. A cross bar is secured at the rear of the truck bed, and the bar and the rear edges of the cover panels are equipped with cooperating fastening means for locking the rear edge of the cover member on the bed. The tail gate is also provided with fastening means adapted to cooperate with the fastening means on the rear edge of the cover member for holding the gate closed.

The foregoing and other objects, features and advantages of the invention will be apparent from the following more detailed description of a preferred embodiment of the invention, as illustrated in the accompanying drawings, wherein:

FIG. 1 is a perspective view of a pickup truck having a load carrying compartment provided with a cover assembly constructed in accordance with the teachings of the present invention;

FIG. 2 is a fragmentary rear elevation view, partially in section, of the compartment and cover construction of FIG. 1, with parts broken away to reveal some of the inner structure of the compartment and cover;

FIG. 3 is a fragmentary sectional elevation view of the front portion of the compartment and cover construction of FIG. 1 illustrating the structural relationship between the front portions of the cover and compartments:

FIG. 4 is a fragmentary detail view showing the manner in which the two cover panels are hinged together;

FIG. 5 is a fragmentary perspective view of the rear portion of the compartment and cover construction of FIG. 1 showing in detail the structural relationship between the central rear portion of the cover, the compartment and the tail gate;

FIG. 6 is a fragmentary detail view illustrating the locking structure between one of the outer side edges of the cover and one of the side walls of the truck compartment; and FIG. 7 is a fragmentary section view taken along the line 7—7 of FIG. 6, showing further detail of the locking structure.

Referring now to the drawings, there is shown in FIG. 1 a conventional pickup truck 10 having a cab 12 and a load carrying compartment 14, commonly referred to as a bed. The truck bed 14, is defined by a substantially horizontal floor surface 16, an upstanding front wall 18, upstanding side walls 20, 22 and a rear wall 24, commonly referred to as a tail gate. The tail gate 24 has its bottom edge 26 hinged to the rear edge 28 of the truck bed floor 16, and collapsible links 30, 32 are provided between the side edges 34, 36 of the tail gate and the rear edges 38, 40 of each of the truck bed side walls. Thus, the tail gate is pivotable between an upstanding, substantially vertical position and a substantially horizontal position (shown in FIG. 1) aligned with the truck bed floor to facilitate loading and unloading operations.

The truck bed 14 is provided with a novel cover assembly 42 comprised of two longitudinally extending cover panels 44, 46 having inside edges 48, 50, outside edges 52, 54, front edges 56, 58 and rear edges 60, 62, in the form of downwardly depending skirts. The cover panels 44, 46 may be fabricated of any suitable rigid, yet lightweight material, such as glass fiber reinforced resin, aluminum or waterproof plywood, and the underside of each panel is provided with transversely and longitudinally extending stiffening bars 64 and 65, repectively, for strength and rigidity.

As shown best in FIG. 4, the cover panels 44, 46 are secured to one another along their inside edges 48, 50 by means of a single hinge 66 extending longitudinally substantially throughout the length of the cover panels. While several smaller hinges may be employed, the preferred construction contemplates the use of the single hinge 66 running substantially the length of the cover and coated or covered with a layer or sheet of rubber material 68 for preventing moisture from entering the truck bed 14 between the adjacent inside edges 48, 50 of the panels.

The outside edge 52 of the cover panel 44 is provided with downwardly depending metal projections or tabs 68 adapted to fit in the conventional slots or stake pockets 70 provided in the upper edge 72 of the truck bed side wall 20, for stabilizing the outside edge of the cover panel and preventing relative sliding movement between the panel and sidewall (FIGS. 1 and 3). Similar cooperating tabs and slots (not shown) are provided on the outside edge 54 of the cover panel 46 and the upper edge 74 of the side wall 22.

Mechanisms 73, 75 for locking the outside edges 52, 54 of the cover panels 44, 46 to their associated side walls 20, 22 of the truck bed 14 are best shown in FIGS. 1 6 and 7. While only the locking mechanism 73 for the outside edge 52 of the cover panel 44 will be described, it should be understood that the mechanism 75 for the outside edge 54 of the panel 46 is identical.

The locking mechanism 73 includes a substantially hook-shaped latch 76 pivotably mounted in substantially the center of the outside edge 52 of the cover panel 44 by means of a stud or shaft 78 and nut 79, and a handle 80 is attached to the opposite end of the stud to facilitate operation of the latch. While the handle 80 is shown as extending outside of the outside skirted edge 52, it is contemplated that it may be disposed in a recess (not shown) provided in the skirted edge.

The slot or stake pocket in substantially the center portion of the upper edge 72 of the side wall 20 receives the latch 76, and a tranversely extending pin 84 is mounted in the slot. Thus, when the cover panel 44 is closed, the latch 76 will be disposed in the slot 82, and the panel may be locked in the closed position by simply rotating the handle 80 in the clockwise direction (as viewed in FIGS. 1 and 7). As will be understood the locking mechanisms 73, 75 are suitable of a type conventional per se which are key operated to either permit or prevent rotation of the shafts (as at 78) thereof, as desired.

Cooperating fastening means are also provided on the front and rear edges of the cover panels 44, 46 and the front and rear walls 18, 24 of the bed 14 for securing the cover on the bed. As shown in FIGS. 1 and 3, the fastening means for the front cover edge 56, 58 includes a bracket 90 secured to the inner surface of the truck bed front wall 18 and extending into the bed, and a pair of substantially L-shaped latch members 92, 94 secured to the undersides of the cover panels 44, 46 adjacent their front, inside corners. The latch members 92, 94 face one another, and the horizontal legs 96, 98 thereof are adapted to engage the underside of the bracket 90 when the cover panels are closed (FIG. 3) to secure the front edges of the panels to the front wall of the truck bed.

The fastening means for the rear portion of the cover are provided on the rear edges 60, 62 of the cover panels and on a cross bar 100 which extends between the upper, rear corners of the side walls 20, 22. The opposite ends of the cross bar 100 may be bolted or otherwise suitably secured to the side walls. The cooperating fastening means comprise hook-shaped latches 102, 104 secured on the undersides of the cover panel adjacent their inside, rear corners, and a rearwardly extending pin 106 mounted on the cross bar 100. As best shown in FIG. 5, the hook-shaped latches 102, 104 are adapted to engage the pin 106 when the cover panels are closed thereby fastening the rear edge of the cover to the cross bar 100.

The pin 106 is mounted on the cross bar 100 instead of the tail gate 24 to permit the rear edge of the cover to be secured on the bed even when it is necessary to leave the tail gate open, as when objects longer than the truck bed 14 are to be carried. It is contemplated, of course, that the cross bar may be eliminated and the pin may be mounted on the inside surface of the tail gate if the hauling of long objects is not planned.

The inner surface of the tail gate 24 in the disclosed embodiment is provided with a latch piece 108 adapted to cooperate with the latch 102 on the rear edge 60 of the cover panel 44 to hold the tail gate in its closed (vertical) position. As shown in FIG. 5, the latch piece 108 includes an upwardly extending finger 110 adapted to fit in front of the latch 102 when the cover panel 44 is closed, thereby locking the gate closed.

The disclosed embodiment further includes a collapsible support brace 112 for selectively holding the cover panel 44 open during loading and unloading. The brace 112 comprises a pair of telescoping links 114, 116 and a suitable locking mechanism 118 for holding the linkage in its extended (FIG. 1) position. The outer end of the link 114 is pivotably connected at 120 to the inner surface of the truck bed side wall 20, and the outer end of the link 116 is pivotably connected at 122 to the underside of the cover panel 44. The outer end of one of the links 114 or 116 may be connected to the side wall 20 or cover panel 44 by means of a hand operable quick-disconnect mechanism (not shown) to facilitate installation and detachment of the cover member. While only the cover panel 44 is shown in the drawings as being provided with the support brace 112, it is contemplated, of course, that either or both of the panels may be equipped with such a brace.

In use, when it is desired to load the truck bed 14, either or both of the cover panels 44, 46 and/or the tail gate 24 are opened, and may be held open by the support brace 112. After loading, each panel is closed, thereby automatically fastening the front and rear edges of the cover member 42 to the front wall 18 and cross bar 100 of the truck bed, respectively. This automatic locking of the front and rear edges is accomplished by means of the cooperating latches 92, 94 and the bracket 90 in the front portion of the bed, and the latches 102, 104 and the pin 106 in the rear portion of the bed. If it is desired to have the tail gate closed, it must be closed prior to closing the cover panel 44 so that the tail gate latch 108 will be held in front of the latch 102 on the rear edge 60 of the panel 44.

When the cover panels are closed, the tabs 68 will extend into the slots 70 in the upper edge of each of the side walls 20, 22 and the latch 76 will fit in the slot 82. The outside edges of the cover panels may then be locked to the side walls by rotating the handles 80 to cause the latches 76 to engage the pins 78.

To remove the cover member 42 from the truck bed 14 and permit relatively tall objects to be carried, for example, the outer end of one of the links 114 or 116 is detached from the side wall 20 or cover panel 44, and one of the two cover panels is pivoted until the panels are back-to-back (phantom line position of the panels in FIG. 2). The folded structure may then be lifted off of the truck bed and stored in a relatively small space.

Installation of the cover assembly of this invention on a standard pickup truck is a simple and inexpensive operation, it merely being necessary to bolt or otherwise suitably secure: the pins 84 in the center stake pockets 82; the bracket 90 to the front wall 18 of the truck bed; the opposite ends of the cross bar 100 to the upper rear corners of the side walls 20, 22; the latch 110 to the inner surface of the tail gate 24; and the outer end of support brace link 114 to the inner surface of the side wall 20.

As can be seen from the foregoing, the present invention provides an improved cover assembly for the beds of pickup trucks and the like which facilitates loading and unloading operations, which may be locked on the bed at all four edges, which is relatively lightweight and compact, which is easily removed and replaced, and which is relatively simple and inexpensive to manufacture.

While the invention has been shown and described with reference to a preferred embodiment thereof, it will be understood by those skilled in the art that various changes in form and details may be made therein without departing from the spirit and scope of the invention. For example, more or fewer locking mechanisms may be provided on the peripheral edges of the cover member and at different locations than those illustrated herein. Of course the size of the cover assembly can also be varied to accommodate the cover assembly to truck beds of various sizes.

What is claimed is:
1. In combination with a vehicle body having a substantially horizontal floor surface and upstanding front, rear and two side walls defining a load carrying compartment, a cover member for said compartment; said cover member comprising:

a pair of longitudinally extending cover panels, each having front, rear, inside and outside edges; said cover panels being pivotally attached to one another along their inside edges, whereby either of said cover panels is pivotally movable relative to the other said panels;

bracket means on said front wall of said vehicle body;

front and rear latch means on said cover panels, said front latch means being engageable with said bracket means for restraining said cover member when closed against upward movement;

fastening means mounted on the outside edges of said panels for detachably securing said cover member to one of said side walls;

each of said side walls of said vehicle body including an upper rear corner, said vehicle body including a transversely extending bar having opposite ends secured to said side walls of said vehicle body adjacent said upper rear corners thereof;

said rear wall of said vehicle body being pivotally secured to said floor surface thereof and movable between a substantially vertical, upstanding position and a substantially horizontal position; and rear latch means being provided on said rear wall for cooperating with said rear latch means on one of said cover panels to maintain said rear wall in its upstanding position when the panel is in closed position.

2. In combination with a vehicle body having a substantially horizontal floor surface and upstanding front, rear and two side walls defining a load carrying compartment, a cover member for said compartment; said cover member comprising:

a pair of longitudinally extending cover panels, each having front, rear, inside and outside edges; said cover panels being pivotally attached to one another along their inside edges, whereby either of said cover panels is pivotally movable relative to the other said panels;

bracket means on said front wall of said vehicle body;

front latch means on said cover member and engageable with said bracket means for restraining said cover member when closed against upward movement;

fastening means mounted on the outside edges of said panels for detachably securing said cover member to one of said side walls; and at least one of said front, rear or side walls of said vehicle body including an upper edge having a slot therein and at least one of said front, outside or rear edges of one of said cover panels being provided with a downwardly depending tab adapted to fit into said slot for minimizing relative movement between said vehicle body and said cover member.

3. In combination with a vehicle body having a substantially horizontal floor surface and upstanding front, rear and two side walls defining a load-carrying compartment, a cover member for said compartment; said cover member comprising:

a pair of longitudinally extending cover panels, each having front, rear, inside and outside edges; said cover panels being pivotally attached to one another along their inside edges;

a transverse cross bar mounted between the vehicle side walls adjacent the rear wall;

first rear latch means mounted on one said cover panel adjacent the rear edge thereof for locking to said cross bar; and second rear latch means on the rear wall of said vehicle body for engagement with said first rear latch means.

4. A truck bed and cover construction according to claim 3, wherein said cover panel inside edges are connected to one another by means of a single, waterproof hinge extending longitudinally substantially throughout the length of said cover panel inside edges.

5. A pickup bed cover assembly adapted for installation over the open pickup bed having a fixed front wall, fixed side walls each provided with a plurality of stake pockets, and an openable tail gate, said cover assembly comprising:
  (a) two cover panels;
  (b) hinge means extending longitudinally of and joining said cover panels together;
  (c) tab means extending below said cover panels at the sides thereof remote from said hinge and configured to fit within some of the said plurality of stake pockets of the pickup bed and anchor the said panels against horizontal movement with respect to the sides of the pickup bed when the panels are resting thereon; and
  (d) lock means for said panels including movable components on each said panels and fixed means mounted in a stake pocket at each side of said pickup bed.

References Cited

UNITED STATES PATENTS

| | | |
|---|---|---|
| 560,838 | 5/1896 | Choate. |
| 1,861,277 | 5/1932 | Kjolseth _____ 296—100 X |
| 2,757,041 | 7/1956 | Alcorn _____ 296—100 |
| 2,938,363 | 5/1960 | Dickinson et al. _____ 220—29 |
| 3,069,199 | 12/1962 | Reardon et al. _____ 296—100 |
| 3,075,234 | 1/1963 | Speakman _____ 220—32 X |
| 3,180,674 | 4/1965 | Pounds _____ 296—100 |
| 3,270,902 | 9/1966 | Breault _____ 220—29 X |

FOREIGN PATENTS 810,119  7/1949  Germany.

BENJAMIN HERSH, *Primary Examiner.*

ROBERT R. SONG, *Assistant Examiner.*

U.S. Cl. X.R.

217—60